6719X
J. STIMPSON.
Car Wheel.
Patented Aug. 23, 1831.
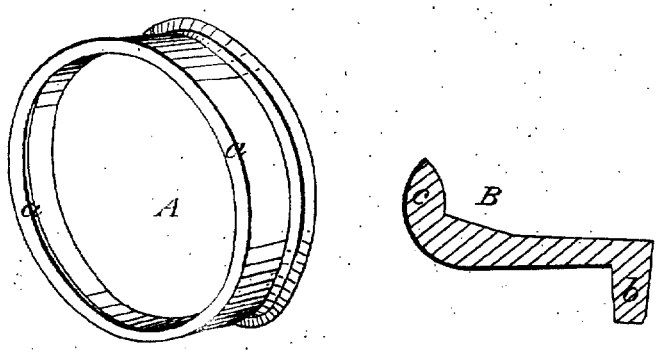
AM. PHOTO-LITHO. CO. N.Y. (OSBORNE'S PROCESS.)

[illegible] 6198 [illegible]
[illegible] Baltimore, Maryland.

Letters Patent.

The schedule referred to in these Letters Patent and making part of the same, containing a description in the words of the said James Thompson himself of his improvement in the mode of forming and using cast or wrought iron plates or rails for rail road carriage wheels to run upon, for which Letters Patent were granted dated, the twenty third day of August 1831, which Letters Patent being hereby cancelled on account of a defective specification.

To all whom these presents shall come.

Be it known that I James Thompson of the City and County of Baltimore and State of Maryland, have invented a new and useful improvements in the mode of forming and using cast or wrought iron plates or rails for rail road carriage wheels to run upon; more especially for those to be used on the streets of cities, wharves and elsewhere; and that the following is a full and exact description of said inventions or improvements, as invented or improved by me. Viz.

For the purpose of carrying rail roads through the streets of cities [illegible] in rail road carriages, whether the [illegible] [illegible] and at the same time not to cause any impediment [illegible] operations, I use rails [illegible] applied in the following [illegible]. If it is desired to use cast iron plates [illegible] rails, and the wheels generally to run upon the [illegible] as follows. I make a [illegible] in the top [illegible] wide [illegible] [illegible] [illegible] [illegible]

[illegible] Entered [illegible] [illegible] [illegible]

[illegible] that said [illegible] may be more easily [illegible]
[illegible] by the flanches, on the inside of the
channels. Hence a check or [illegible] measuring about three
quarters of an inch at top and as high nearly as the top of
the plate on the outside of the channel. The top edge of the plate
next to the channel may be chamfered or bevelled so as to
free the cones, or the largest part of the wheels at the junc-
tion of the flanch and tread and thus to keep them from
touching; except where there is a slight crook or curve in
the track. I then in that part of the outer track use rails in
which have no chamfer, or bevel for the distance neces-
sary for the cones or the larger part of the peripheries of the
treads of the wheels at the junction of the flanches thus
to measure the necessary distance of said outer track over the
inner one, that there may be no necessity of the wheels [illegible]
slipping while passing through the crook or curve, and
where there is a curve, to be turned shorter than the cones
would effect at that point, when laid in the track. I [illegible]
up or raise the bottom of the outer flanch channel that the
periphery of the flanch alone, shall bear, and take the whole
weight of the load upon the principle specified in a patent
of the same date with the present, thus freeing at the same
time the treads entirely for a distance necessary to turn the
curves, and when they arrive upon the straight track again
the chamfered rails are to be used on both tracks, and the
channels to be alike in depth upon both tracks. It is to
be understood that the great object in varying the form
of the top of the rails by chamfering or not, and [illegible]
the flanch channel is so to wholly free the flanches from
touching, or [illegible] them [illegible] to free the treads [illegible]
[illegible] a crooked or curved one [illegible]
[illegible] the track [illegible]
[illegible]

[illegible]

[illegible] of this invention in [illegible] in the case of [illegible]
[illegible] of the same instead of giving lateral play to the
wheels [illegible] channels [illegible] the flanches to run in [illegible]
of the tracks, [illegible] the slipping of the wheels is avoided. These narrow
channels are of essential advantage [illegible] as they obviate the
whole difficulty heretofore experienced in the passing of [illegible] and
other carriages with narrow wheels along the same tracks; the part
of the plates under the treads may be formed a little narrowing on the
top and hollow underneath to save weight and as wide as the tread
outside of the flanches, if laid upon wooden rails as before stated
the object in this would be to cover the wood as wide at least as the tread
of the wheels that they may not be injured by the pavements, or the wooden
rails by other carriages &c. I have now described this kind of plate in
its form, and as laid in the tracks proper for a straight or curved
way. It must be understood of course that there must be different
patterns for casting the chamfered and unchamfered rails and
those with deep and shallow channels. The cross section of the plate
should measure on the base about six inches and a half, the top six
inches and quarter and they should be in depth about two inches
and a quarter, the inside [illegible] three quarters of an inch in thickness, the
channel one inch and a half wide at top, and one and a quarter at bottom
[illegible] and the part outside of the channel which will be under the
treads four inches although they may be [illegible] if desired. They may be cast in
convenient lengths say three to four feet, the ends should be bevelled say upon
an angle of forty five degrees, or a tenon and mortice, with spike holes through
them in order that they may be fastened down to the wood in or stone
rails with the spikes. In most cases, I should when bedded into stone
rails, cast plates two inches and three quarters wide at top and three
[illegible] cross section, the channel five eighths of an inch in depth [illegible]
[illegible] one inch at the bottom [illegible]
[illegible] thickness below the bottom of the channel
[illegible] plates [illegible] of the channel would be
[illegible]

[illegible]

formed at the inside as before described. In this kind of rail plate the
intention is that the wheels shall run and bear only upon their flan-
ches, and this mode is by far the best for the use of [illegible] as it
requires less power to move the cars while they are undoubtedly as
safely guided, and the rails are as durable and much lighter than in
any other way, they require no clearing out, to which the deep ones
will be liable, as the flanches will effect this in such shallow grooves
The shallow channels may be made narrower than the deep ones the
form of the flanches admitting this they being much thicker at their
juncture with the treads of the wheels than at their peripheries, and
therefore require more room in the deep channels to allow the dirt
to rise freely out. But should the common flat wrought iron rails
be preferred, they may be laid double all the distance thus forming
the flanch channel between them, but only where there is a curve
or crook in the tracks to be turned, then in those curves the outer
channel may be discontinued, or so filled up as to have the peripheries
of the flanches bear alone on that side or the plate in the outer track
may be of only one wide piece, with a flat surface laid centrally [illegible]
under the flanches and nearly even with the surface of the pave-
ments, the flanch channel being left entire, on the inside track; or
an iron plate may be rolled with the channel in the centre in one piece,
that is a plate two inches wide on each side of the channel, more or less
about three quarters of an inch thick channel one inch and a quarter
wide at top and one inch at bottom, five eights of an inch deep, all the
plate of the same thickness throughout if thought best, and with spike
holes alternately on each side of the channel. Where it is necessary to
cross a water gutter in the street use a cast iron plate to cover said
gutter, with the flanch channels cast in said plate and all the part
or space between the channels cast rough, to prevent horses feet
from slipping. It may be cast in one or more pieces but I prefer
its being in one, as it will then be stronger at the [illegible] of the same
thickness. And where [illegible] a [illegible] the
same [illegible] the flanch channel will [illegible]

[illegible] on the inner end of the rails,
while the outer end may be [illegible] stone or other [illegible]
[illegible] of the [illegible] be [illegible] if desired upon the
principle explained in the [illegible] patent before alluded to. The [illegible]
cast iron plate which covers the water gutters, being cast in one
piece and of a width sufficient to cover any street gutter, should have
ribs cast underneath about one inch and a quarter deep inclusive
of the thickness of the plate, [illegible] under the outer edges to increase its
strength. In some cases I cover the gutters the whole width of the
street with cast iron plates and some distance past the curbings
thus making a very great improvement to the street for the riding
travel. It will be observed that the rail plates are directed to be made
widest upon their bases, the effect of which is that when sunk into
a channel in the centre of a stone or wooden rail the pressure of
[illegible] into the seams on each side of the iron by the common carri
age wheels rolling over them will confine the iron plates between
the joints of the stone or wood. What I claim as my inventions
or improvements are the employment of plates or rails either of cast or
wrought iron constructed upon the principle or in the manner herein
described, having narrow grooves for the flanches to run in by which
they are perfectly adapted to the unobstructed passing of all kinds of [illegible]
carriages used in streets over them. The [illegible] of the peripheries
of the flanches [illegible] of the cone, or rise on the tread of the wheel upon
the rail in the manner and for the purposes set forth, and the em
ployment of plates upon cast iron upon the principle described
for the [illegible] of gutters, and the turning of curves. And I do hereby
declare that I do not intend to confine myself to the precise
forms and dimensions given, these being intended merely to
[illegible] the nature, object, and mode of
carrying [illegible] my said inventions

[illegible]
[illegible]
[illegible]

[illegible]